(12) United States Patent
Frame

(10) Patent No.: US 9,027,204 B2
(45) Date of Patent: *May 12, 2015

(54) CASTERS HAVING WEIGHT TRANSFERRING TAB

(75) Inventor: William F. Frame, Hockessin, DE (US)

(73) Assignee: Jacob Holtz Company, Lester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/430,446

(22) Filed: Mar. 26, 2012

(65) Prior Publication Data

US 2012/0180259 A1 Jul. 19, 2012

Related U.S. Application Data

(63) Continuation-in-part of application No. 13/281,289, filed on Oct. 25, 2011, now Pat. No. 8,407,856, which is a continuation of application No. 12/434,169, filed on May 1, 2009, now Pat. No. 8,042,226, which is a continuation of application No. 12/115,132, filed on May 5, 2008, now Pat. No. 7,546,662.

(60) Provisional application No. 61/467,921, filed on Mar. 25, 2011, provisional application No. 60/916,360, filed on May 7, 2007.

(51) Int. Cl.
| | |
|---|---|
| B60B 33/00 | (2006.01) |
| A47B 91/00 | (2006.01) |
| A47B 91/12 | (2006.01) |
| A47C 7/00 | (2006.01) |
| A47C 19/02 | (2006.01) |
| B60B 33/02 | (2006.01) |

(52) U.S. Cl.
CPC ......... *B60B 33/0044* (2013.01); *Y10T 16/1853* (2015.01); *Y10T 16/184* (2015.01); *A47B 91/12* (2013.01); *A47C 7/006* (2013.01); *A47C 19/024* (2013.01); *B60B 33/0021* (2013.01); *B60B 33/0042* (2013.01); *B60B 33/021* (2013.01); *B60B 2900/711* (2013.01)

(58) Field of Classification Search
USPC ................... 16/47, 48, 35 R, 35 D, 31 R, 44; 188/1.12, 29, 69, 31; 280/64, 65, 280/47.38, 47.39, 47.41
See application file for complete search history.

(56) References Cited

U.S. PATENT DOCUMENTS

| 19,369 A | 2/1858 | Kinzer |
|---|---|---|
| 127,862 A | 6/1872 | Gory |

(Continued)

FOREIGN PATENT DOCUMENTS

| DE | 2 153 324 A1 | 5/1973 |
|---|---|---|
| DE | 27 37 649 A1 | 2/1979 |

(Continued)

OTHER PUBLICATIONS

"Polycarbonate Caster is Stronger Than Spoked Steel Wheel, Costs Less"; Modern Plastics; vol. 42; Oct. 1964; pp. 109-111.

(Continued)

*Primary Examiner* — Chuck Mah
(74) *Attorney, Agent, or Firm* — KED & Associates LLP

(57) ABSTRACT

The invention comprises a caster having a yoke having a weight transferring tab and a wheel being rotatably attached to the yoke. The wheel has a groove for receiving the weight transferring tab. The tab transfers the weight of a load applied to the yoke to the groove. The caster includes various accessories, such as various stem, wheel, brake, and axle/hub configurations.

18 Claims, 13 Drawing Sheets

(56) References Cited

U.S. PATENT DOCUMENTS

| | | | |
|---|---|---|---|
| 277,954 A | 5/1883 | Stengel | |
| 292,797 A | 2/1884 | Eberle | |
| 409,495 A | 8/1889 | Pederson | |
| 978,161 A | 12/1910 | Holmes | |
| 1,435,371 A * | 11/1922 | Bartlett et al. | 16/47 |
| 1,892,845 A | 1/1933 | McGrath | |
| 1,900,672 A | 3/1933 | Uhl | |
| 2,170,257 A | 8/1939 | Anderson | 16/31 |
| 2,541,514 A * | 2/1951 | Herold | 295/8.5 |
| 2,618,490 A * | 11/1952 | Frischmann | 280/43.12 |
| 2,648,073 A | 8/1953 | Nowell | 5/285 |
| 2,713,179 A | 7/1955 | Clifton | 16/47 |
| 3,060,488 A | 10/1962 | Skupas et al. | 16/18 |
| D220,938 S | 6/1971 | Harlang | D8/226 |
| 3,818,541 A | 6/1974 | Daniels | 16/18 |
| 3,977,040 A | 8/1976 | Sugasawara | 16/45 |
| D245,313 S | 8/1977 | Koepke | D8/375 |
| 4,455,707 A | 6/1984 | Screen | 16/35 |
| 4,646,371 A | 3/1987 | Nowell | 5/200 |
| 4,735,459 A | 4/1988 | Massonnet | 301/1 |
| 5,018,306 A | 5/1991 | Prevot | 49/425 |
| 5,119,525 A | 6/1992 | Melara | 16/18 |
| 5,465,986 A | 11/1995 | MacRae | 280/33.994 |
| 5,537,715 A | 7/1996 | Yang | 16/35 |
| 5,568,671 A | 10/1996 | Harris et al. | 16/18 |
| 5,593,461 A | 1/1997 | Reppert et al. | 29/11 |
| 5,598,605 A | 2/1997 | Tomasiak | 16/45 |
| 5,785,154 A | 7/1998 | Chen | 188/1.12 |
| 6,092,262 A | 7/2000 | Lin | 16/35 |
| 6,351,861 B1 | 3/2002 | Shows et al. | 5/618 |
| 6,397,412 B1 | 6/2002 | Quintile | 5/200.1 |
| 6,419,319 B1 | 7/2002 | Sakurai | 297/344.12 |
| 6,453,508 B1 * | 9/2002 | Denner | 16/35 R |
| 6,550,100 B2 | 4/2003 | Drucker et al. | 16/31 |
| 6,615,448 B2 | 9/2003 | Melara | 16/35 |
| 6,637,071 B2 | 10/2003 | Sorensen | 16/32 |
| 6,725,501 B2 | 4/2004 | Harris et al. | 16/35 |
| 6,839,939 B2 | 1/2005 | Donakowski | 16/45 |
| 6,880,203 B1 * | 4/2005 | Aubin | 16/48 |
| D505,316 S | 5/2005 | Topel | D8/375 |
| 7,150,070 B2 | 12/2006 | Donakowski | 16/45 |
| D573,452 S | 7/2008 | Graffunder et al. | D8/375 |
| 7,926,145 B2 * | 4/2011 | Liao | 16/35 R |
| 2002/0178539 A1 | 12/2002 | Donakowski | 16/18 |
| 2005/0108851 A1 | 5/2005 | Dayt | 16/31 |

FOREIGN PATENT DOCUMENTS

| | | |
|---|---|---|
| DE | 31 30 081 A1 | 3/1983 |
| DE | 39 13 722 A1 | 3/1990 |
| EP | 0 268 145 A3 | 5/1988 |
| EP | 0 486 850 A1 | 5/1992 |
| GB | 2 091 090 A | 7/1982 |
| JP | 56-063502 A | 5/1981 |
| JP | 59-038101 A | 3/1984 |
| JP | 07-257104 A | 10/1995 |
| JP | 08085302 A * | 4/1996 |
| JP | 09-058203 A | 3/1997 |
| JP | 09-226308 A | 9/1997 |
| JP | 2000-052705 A | 2/2000 |
| JP | 2000-225804 A | 8/2000 |
| JP | 2001-334805 A | 12/2001 |
| KR | 10-2003-078984 A | 10/2003 |
| KR | 10-2003-094176 A | 12/2003 |
| WO | WO 99/19157 A1 | 4/1999 |
| WO | WO 00/21410 A1 | 4/2000 |

OTHER PUBLICATIONS

"Dimensions of Design"; Modern Plastics; vol. 42, No. 8; Apr. 1965; pp. 88-94, 175-176.

Hoodbhoy, A.I.; "Designing With Plastics EM Dash Cast Solid-Polyurethane Industrial Tires"; Plastics Engineering; vol. 32; No. 8; Aug. 1976; pp. 37-38.

"'Creeper Rolls' Right Over Cords and Cracks"; Advanced Materials and Processes, vol. 162, No. 5; May 2004; p. 10.

International Search Report and Written Opinion dated Aug. 14, 2008 issued in Application No. PCT/US2008/062659.

Chinese Office Action dated Oct. 31, 2011 issued in Application No. 200880014985.6.

European Search Report dated Nov. 29, 2011 issued in Application No. 08 74 7646.

* cited by examiner

CASTERS HAVING WEIGHT TRANSFERRING TAB

CROSS-REFERENCE TO RELATED APPLICATIONS

The present application claims the benefit of U.S. Provisional Application No. 61/467,921 filed on Mar. 25, 2011 and is a Continuation-in-Part of U.S. patent application Ser. No. 13/281,289, filed on Oct. 25, 2011, which is a Continuation Application of prior U.S. patent application Ser. No. 12/434,169, filed on May 1, 2009 (now U.S. Pat. No. 8,042,226), which is a Continuation Application of prior U.S. patent application Ser. No. 12/115,132 filed on May 5, 2008 (now U.S. Pat. No. 7,546,662), which claims the benefit of U.S. Provisional Application No. 60/916,360 filed on May 7, 2007, all of which are incorporated herein by reference.

STATEMENT REGARDING FEDERALLY SPONSORED RESEARCH OR DEVELOPMENT

The present invention was not developed with the use of any Federal Funds, but was developed independently by the inventor.

BACKGROUND OF THE INVENTION

Casters are well known in the furniture industry as a device for allowing furniture to roll across floors. Casters are a particularly common attachment to bed frames and store displays. Traditionally in order to withstand the pressure and weight of beds, people on the beds, and weighted store displays, the yoke of bed frame casters have been made from metal. In order to reduce cost and weight it is desirable that a caster be manufactured with plastic parts.

SUMMARY

The foregoing summary and the following detailed description of the invention, will be better understood when read in conjunction with the appended drawings. For the purpose The invention comprises a caster having a yoke having a weight transferring tab and a wheel being rotatably attached to the yoke. The wheel has a groove for receiving the weight transferring tab. The tab transfers the weight of a load applied to the yoke to the groove. The caster having various accessories, such as stem configurations, wheel configurations, brakes, and axle/hub configurations.

The caster may include a stem being connected to the yoke and being rotable with respect to the yoke. The stem may also be non-rotable with respect to the yoke. The stem may have a directional shape, such as square or triangular, and a bore may be formed in the yoke for receiving the stem. The bore may have a complementary shape, together the shape of the stem and yoke bore ensure that the stem is aligned with a direction in which the caster travels when in use. The stem may include a flat plate for attachment to the load which is aligned with the direction in which the caster travels when in use. The stem may be disposed substantially on a centerline of the yoke and the tab transfers the load applied to the stem directly to the groove or to the axle or to an interposed disk. The stem may be attached to the yoke by a snap-fit connection or a press-fit connection.

The caster may include a side brake or a tread brake. The wheel include a single wheel, or a pair of separate wheels, or a single wheel with a groove.

The caster may have a yoke is capable of supporting at least about 250 pounds of weight applied to the caster.

BRIEF DESCRIPTION OF THE DRAWINGS

The foregoing summary and the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

DETAILED DESCRIPTION OF THE INVENTION

Figure 1:
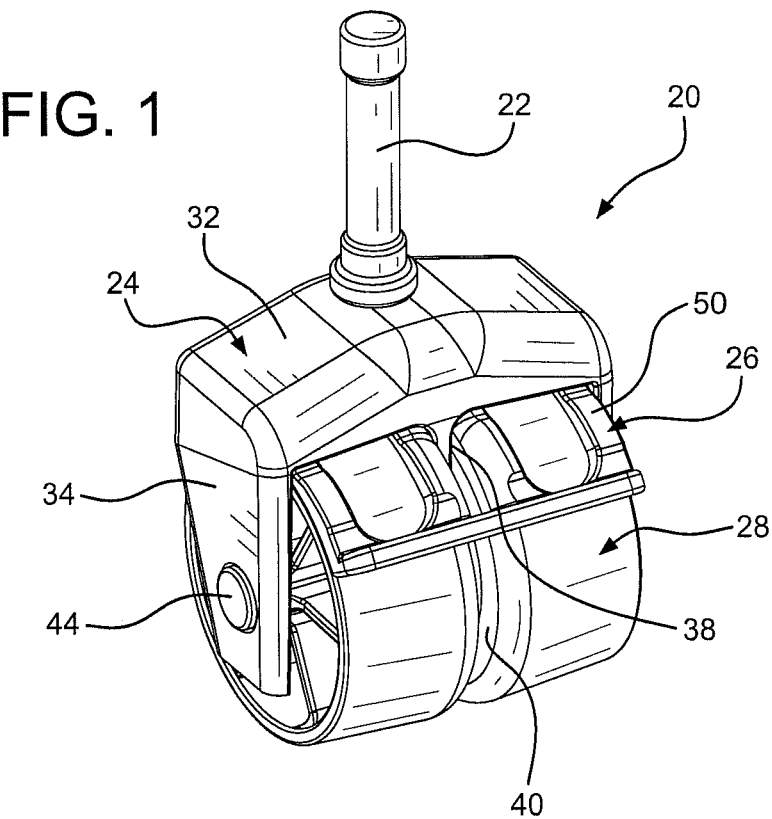
FIG. 1 shows a top perspective view of a first embodiment of a caster in accordance with the present invention.
Figure 2:
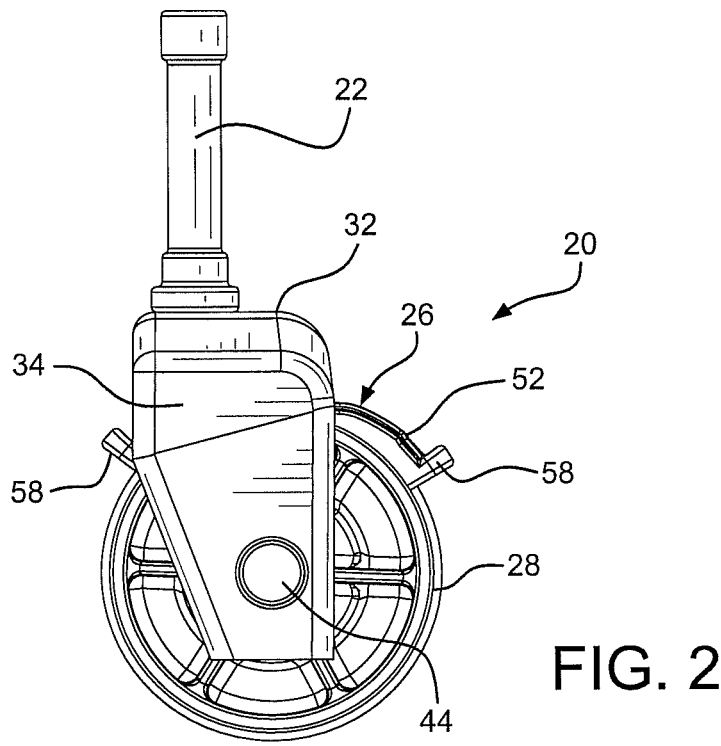
FIG. 2 shows a left side view of the caster of FIG. 1.
Figure 3:
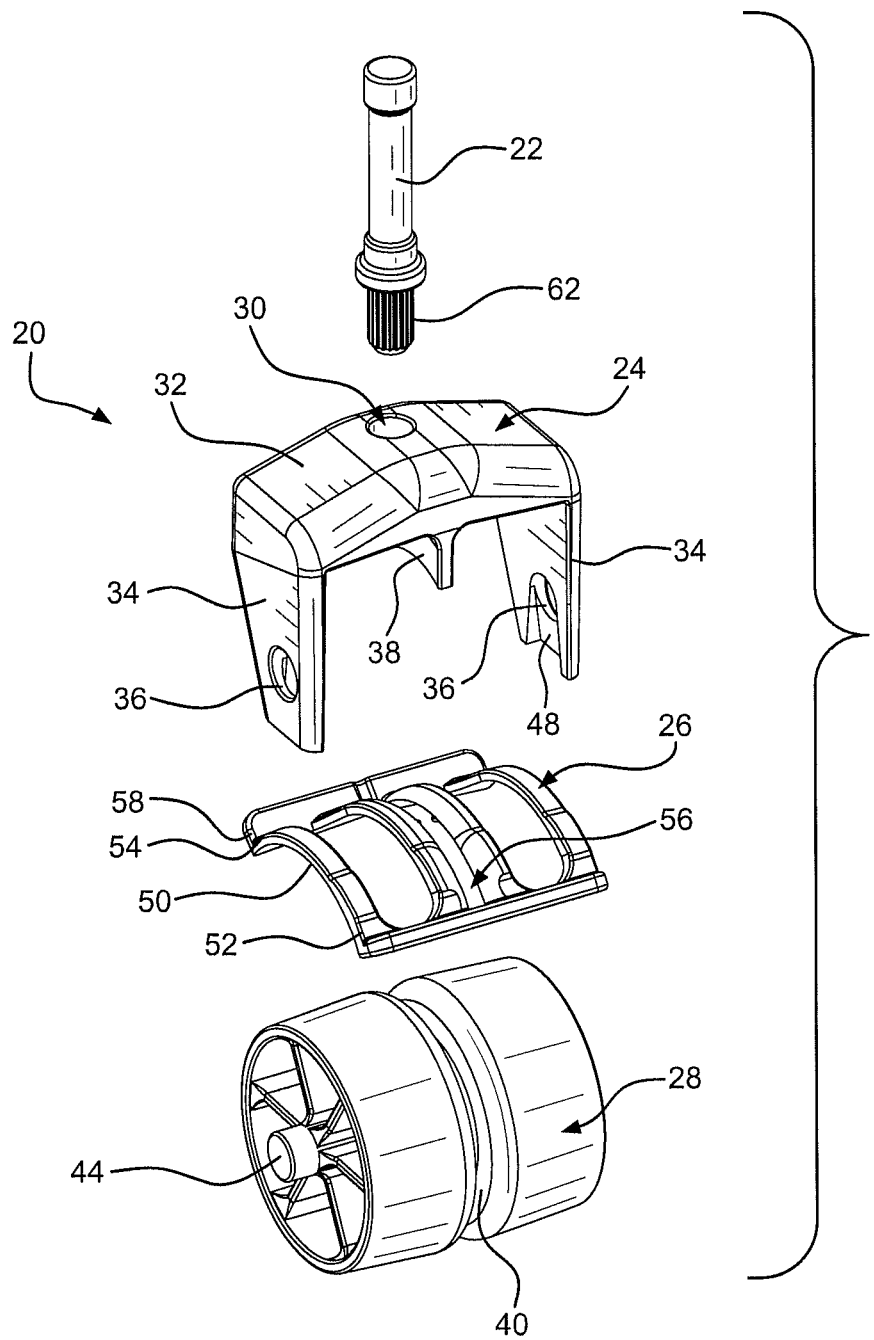
FIG. 3 shows a top perspective exploded view of the caster of FIG. 1.

FIGS. 1 through 3 show a caster 20 of a first preferred embodiment of the present invention. The caster 20 comprises a stem 22, a yoke 24, a brake 26, and a wheel 28. The stem 22 connects the caster 22 to a piece of furniture (not shown), preferably a bed, although it may be attached to any object including other types of furniture and non-furniture objects.

When using the term "caster" in this application it is meant to refer to both the combination of the stem 22, yoke 24, and wheel 28, and also just the yoke 24 and the wheel 28 (without a stem 22).

As best seen in FIG. 3, the stem 22 is preferably fabricated from metal or plastic and connects the caster 20 to the yoke 24 via a cylindrical bore 30 formed in the top portion 32 of the yoke 24. In one preferred embodiment the stem 22 snaps into the cavity 30 through a pressure fit, as described in greater detail below.

The yoke 24 is preferably fabricated from a single piece of thermoplastic material formed through an injection molding process. The yoke 24 comprises a laterally extending top portion 32 and a pair of aim portions 34 extending downwardly from the top portion 32 for supporting the wheel 28 thereto. A stem attachment bore 30 is formed in the top portion 32. Wheel bearings 36 are formed in the distal ends of each arm 34. A tab 38 extends downwardly from the underside of the top portion 32 of the yoke 24. As described in greater detail below, the tab 38 fits into a groove 40 formed on the surface of the wheel 28.

Stiffening ribs or webs (not shown in this embodiment) may be integrally formed on the underside of the top portion 32 of the yoke 24. These ribs/webs provide additional strength and reduce cost by decreasing the required thickness of the yoke 24 thereby reducing the total quantity of plastic required, as described in greater detail below in connection with weight-bearing tab 38.

The wheel 28 may be fabricated from a unitary piece of plastic material formed through injection molding, though other fabrication methods and layouts are contemplated and fall within the scope of the invention. For example, the wheel 28 may be formed of two separate wheel portions or may be formed integrally with the various portions being assembled together. The wheel 28 has a substantially cylindrical shape and has a groove 40 formed on the surface thereof and running around a substantially central portion (coaxially with its axis of rotation) of the wheel 28. It should also be understood that the wheel 28 may have dimensions and configurations that are different from the wheel depicted in the various embodiments. For example the width of the wheel may be thicker or thinner; the diameter of the wheel may be larger or smaller, the hub of the wheel may have a greater or lesser diameter; and the like. The groove 40 is designed to receive the tab 38, as described in greater detail below.

The yoke 24 may be fabricated from a glass reinforced nylon material and the wheel 28 may be fabricated from an impact resistant polypropylene material. Of course, other materials are also suitable depending upon design considerations. Alternately, the yoke 24 and wheel 28 may be fabricated from different types of plastic. Preferably, the plastics are selected so that the coefficient of friction between the weight-bearing tab 38 and the wheel 28 is less than the coefficient of friction between the wheel 28 and the floor across which it will roll. This balance ensures that the caster 20 rolls easily when loaded with a mattress and box-spring or other heavy load. Likewise, the yoke 24 or the wheel 28 may be made out of hardened rubber instead of plastic.

The wheel 28 includes a shaft 44 extending from either side of the wheel 28, serving as an axle and axis of rotation upon which the wheel 28 rotates when the ends of the shaft 44 are rotatably mounted in the wheel bearings 36 of the yoke 24. The wheel 28 may be solid or hollow. The shaft 44 is may be integrally formed as part of the wheel 28 through an injection molding process; however, it should be understood that other forms of the invention, such as a separately formed shaft 44, are contemplated and fall within the scope of the present invention. For example the shaft 44 may be a separate axle element on which the wheel 28 rotates and the axle may be formed from a different material than the wheel 28, such as steel or other strong, durable material, as described below. It should also be understood for embodiments having a separate axle a braking force does not get applied to the wheels by the weight-bearing tab since the wheels freely rotate on the axle and axle itself does not rotate. The weight-bearing tab does, however, transfer the weight of the attached load (usually via the stem) to the axle.

The shaft 44 may be hollow or solid. The caster 20 may be fabricated with or without a separate axle (not shown in this embodiment) depending upon design considerations. Fabrication without a separate axle reduces cost and weight as neither the axle or axle attachment hardware (such as rivets or screws) are required. Fabrication with a separate axle, especially with an axle fabricated from a strong material such as steel or the like, increases the strength and bearing capacity of the caster 20 among other things.

The distal ends of the yoke arms 34 may include a beveled slot 48 leading to the wheel bearings 36. The beveled slots 48 are configured to receive the ends of the shaft 44 and to guide the shaft 44 into the wheel bearings 36, making it easier to snap the wheel 28 into place in the yoke 24. Preferably the length of the shaft 44 is just slightly longer than the distance between the two wheel bearings 36. Thus, when the wheel 28 is slid into place, the yoke arms 34 are designed to deflect slightly outwardly by the shaft 44. When the shaft 44 reach the bearings 36, the arms 34 return to their normal position leaving the wheel 28 held securely in place within the bearings 36.

The brake 26 is disposed between the outer surface of the wheel 28 and the underside of the top portion 32 of the yoke 24. The brake 26 is a friction brake and includes a curved shoe 50. The curvature of the brake shoe 50 is substantially the same as the curvature of the outer surface of the wheel 28. The outer surface of the brake shoe 50 also has a wedge shape (as best seen in FIG. 2) in which one end 52 of the brake shoe 50 is thicker than the opposite end 54 with a gradual inclination therebetween. A slot 56 is centrally formed to receive the tab 38 therein. An upturned end wall 58 is located on each end of the brake shoe 50. The end wall 58 serves as an actuator handle for a user to grasp in order to operate the brake, as described in greater detail below.

The underside of the yoke 24 has a curved shape that is complementary with the outer surface of the shoe 50, permitting the brake 26 to slide between a first engaged position in which the thicker end 52 of the brake shoe 50 is below the yoke 24 and a disengaged position in which the thinner end 54 of the brake shoe 50 is below the yoke 24. The spacing between the underside of the yoke 24 and the outer surface of the wheel 28 is more than the thickness of the thin end 54 of the brake shoe 50 and slightly less than the thick end 52 of the brake shoe 50. Thus, when the thick end 52 of the brake shoe 50 is below the yoke, the brake shoe 50 is squeezed between the underside of the yoke 24 and the outer surface of the wheel 28 creating a friction fit therebetween and creating a braking force. In contrast, when the thin end 54 of the brake shoe 50 is below the yoke, the wheel 28 is permitted to rotate freely since there is still space between the brake shoe 50, the underside of the yoke 24 and the outer surface of the wheel 28.

Stem 22 includes a fluted surface 62 that renders the stem 22 fixedly attached to the yoke 24 and non-rotatable. It should be understood that the stem 22 may be used with other casters, including but limited to the casters described below. In addition, other stems as described below are suitable for use with caster 20. The stem 22 may be made out of any sufficiently strong material, such as plastic or hardened rubber, instead of metal.

In use, the caster 20 is transfers the weight of the carried load, such as a bed or other furniture item, through the stem 22 and the tab 38 onto the wheel 28 relieving the yoke arms 34 of a large portion of the weight bearing load, thus allowing the yoke 24 to be made from a less strong natured material than metal, such as plastic.

In operation when weight is placed on the stem 22 this weight is transferred to the yoke 24. The tab 38 transfers a great portion of the load weight directly onto the wheel 28, thus relieving stress on the arms 34. The use of a groove 40 in the wheel 28 provides a guide for the tab 38 and prevents lateral forces on the tab from becoming too great. The groove also allows the force of the weight transferring through the stem 22 to be placed closer to the center of rotation of the wheel 28 and not on the surface of rotation of the wheel 28. This makes the caster easier to roll under weight.

Figure 4:
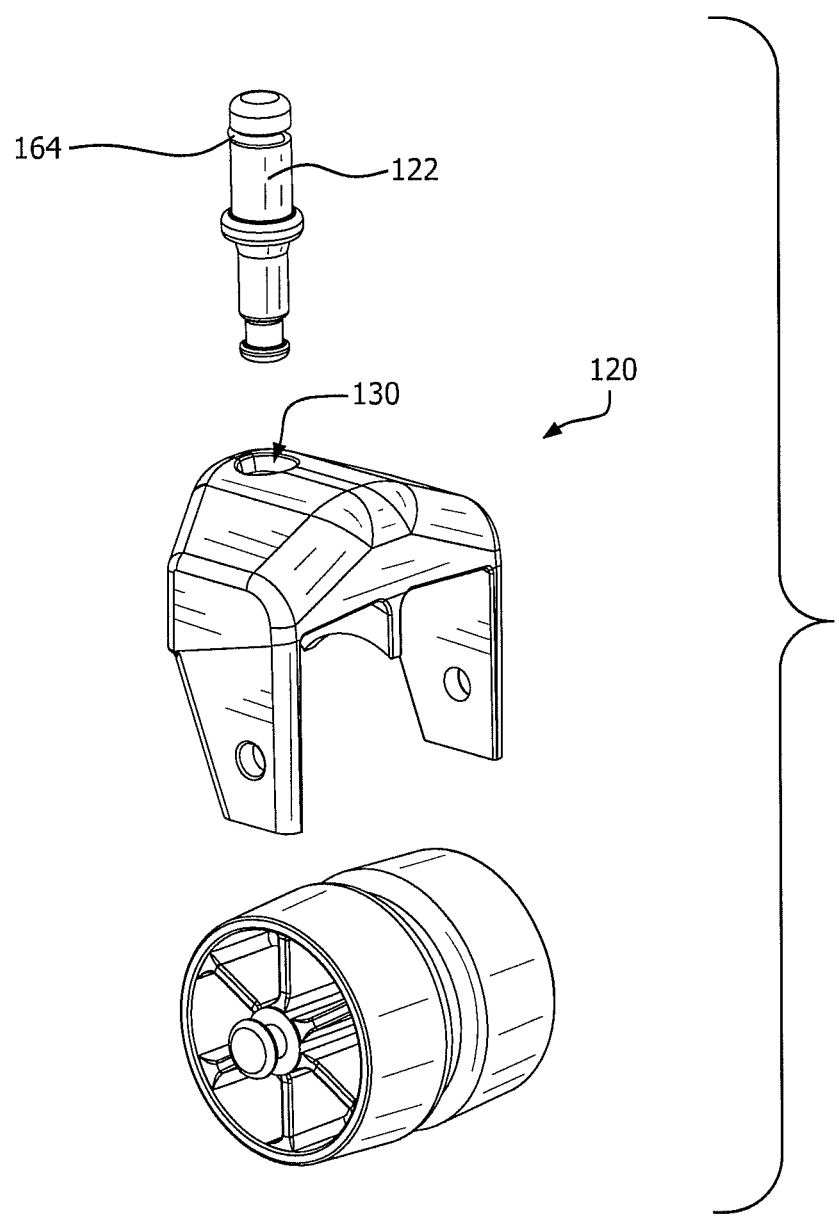
FIG. 4 shows a first alternate embodiment of the caster in accordance with the present invention.

In the embodiments without a separate axle, the tab 38 applies a braking force to the wheel 28 under loaded conditions, thus serving as a brake. When the load on the caster is below a specified amount, the tab 38 does not apply a sufficient force to the wheel to serve as a sufficient braking force. These conditions are described in more detail in the parent application to which this application claims priority, The caster 120 of FIG. 4 is similar to the basic design of caster 20. without the inclusion of the brake 26. Caster 120 includes alternate stem 122 having a split ring 164. In this respect it is similar to the stem as disclosed in the parent applications. Stem 122 is rotatable in cavity 130.

Figure 5:
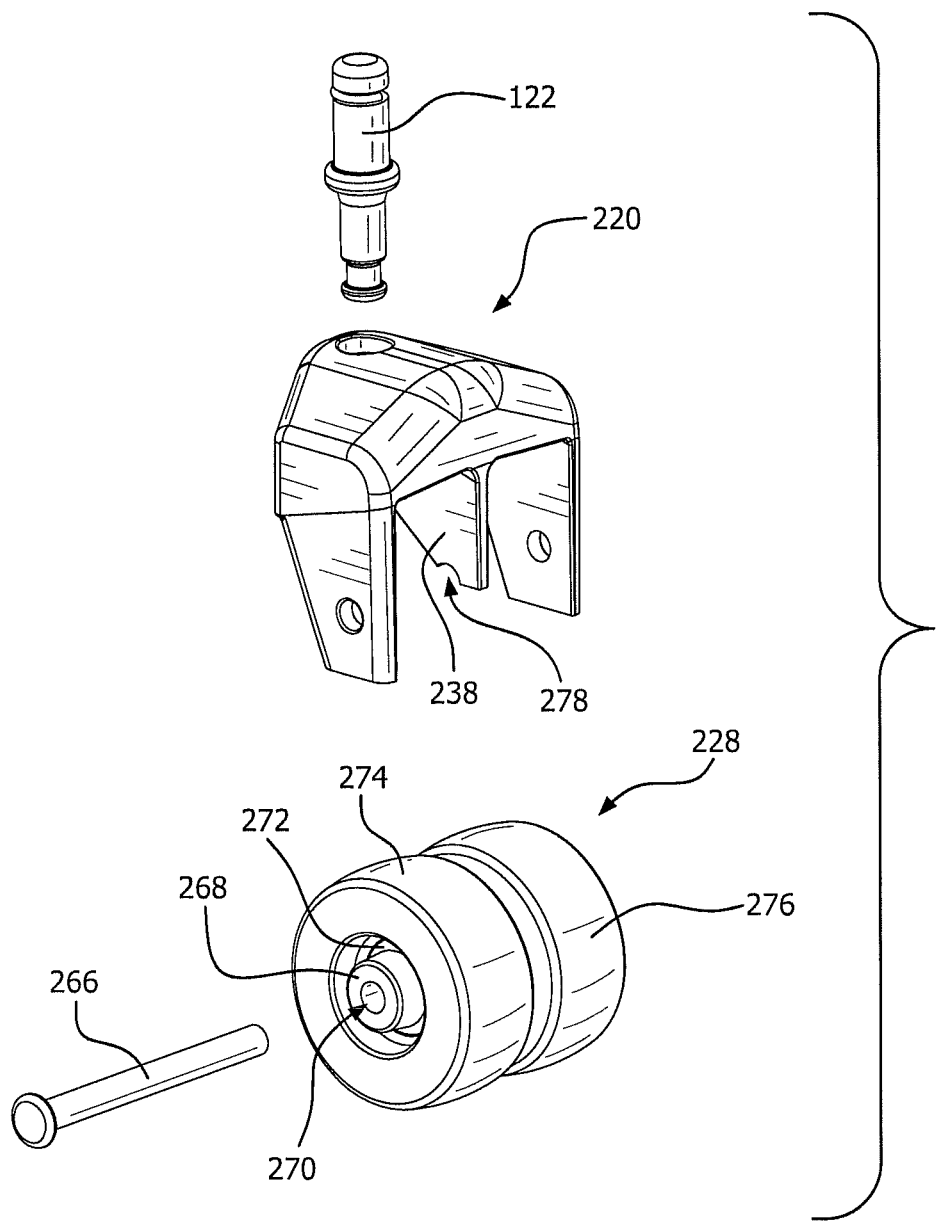
FIG. 5 shows a second alternate embodiment of the caster in accordance with the present invention.

The caster 220 of FIG. 5 is similar to preceding casters 20 and 120. Caster 220 includes a separate axle 266 which extends through an annular hub 268 formed in the wheel 228. The annular hub 268 has a bore 270 through which the axle 266 passes. Wheel assembly 228 is depicted with a sold internal wall design 272 instead of the ribbed design shown in connection with caster 20. It should be understood that ribbed design is also suitable for caster 220 and that the solid wall design 272 is suitable for other caster variations. Caster 220 has an extended weight bearing tab 238 which is configured with a partially-circular opening 278 to engage the outer surface of the axle 266. In this embodiment the wheel assembly 228 comprises two separate wheels 274 and 276. The wheel assembly 228 may comprise a single wheel like wheel assembly 28 with a groove therebetween and a modified tab like tab 38 to engage the groove. The extended tab 238 with opening 278 and the wheel assembly 228 having multiple wheels 276, 278 are suitable for inclusion in other embodiments of the caster.

Figure 6:
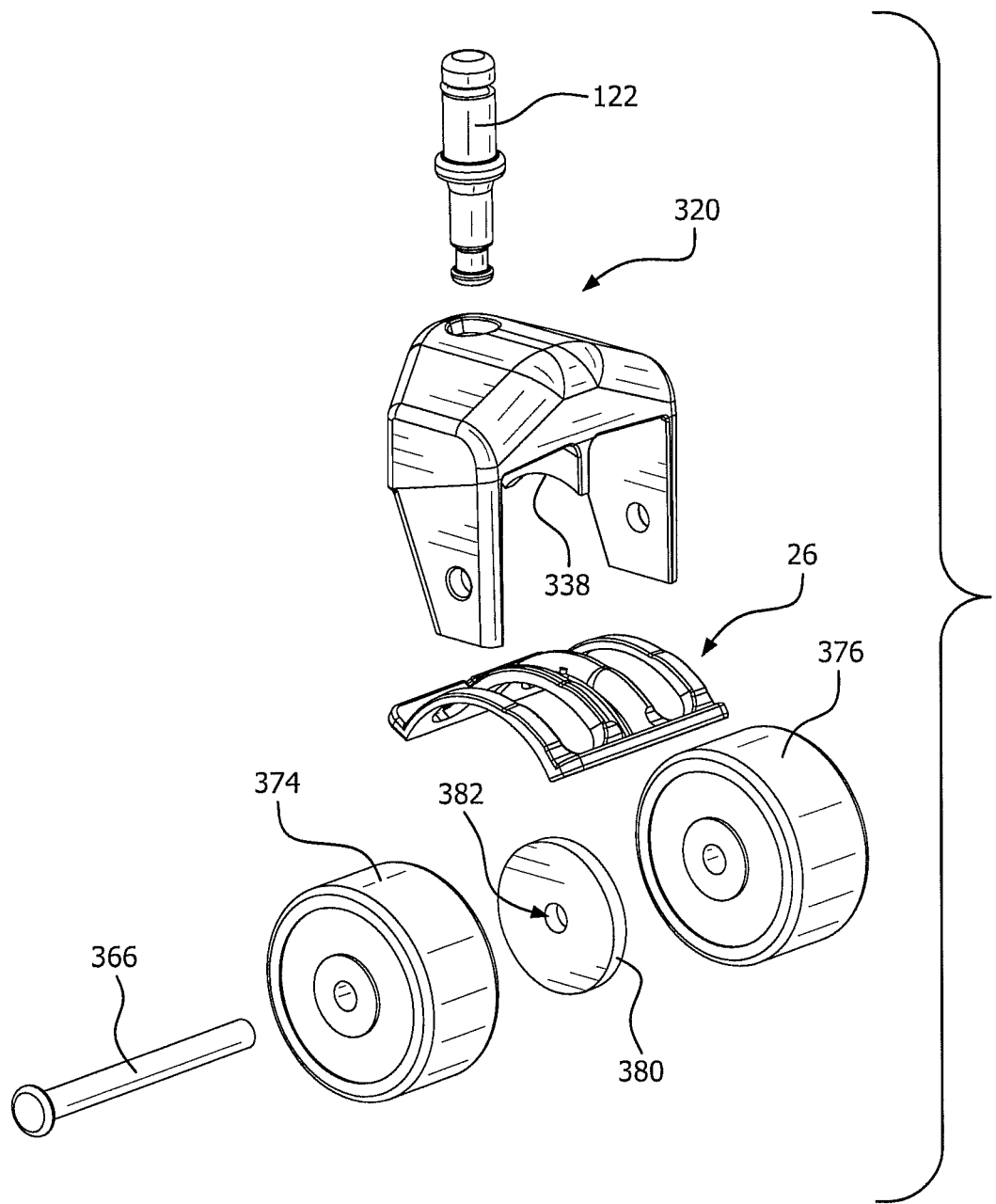
FIG. 6 shows a third alternate embodiment of the caster in accordance with the present invention.

FIG. 6 shows a caster 320 similar to caster 220 of FIG. 5 with the exception of having a disk 380 interposed between wheels 374 and 376 permitting the weight bearing tab 338 to have a similar design as tab 38 (and permitting a similar mold design). The outer circumference of disk 380 is design to be the same as the circumference of groove 40. As such, the diameters of the disk 380 and the diameter of groove 40 of wheel should be substantially the same. Disk 380 also has a central annular hub opening 382 for the axle 366 to pass through. Typically, if the disk 380 is free-spinning on or attached to the axle 366, the weight bearing tab 338 will transfer the weight of the load to the disk 380, but will typically not apply a braking force to the wheel.

Figure 7:
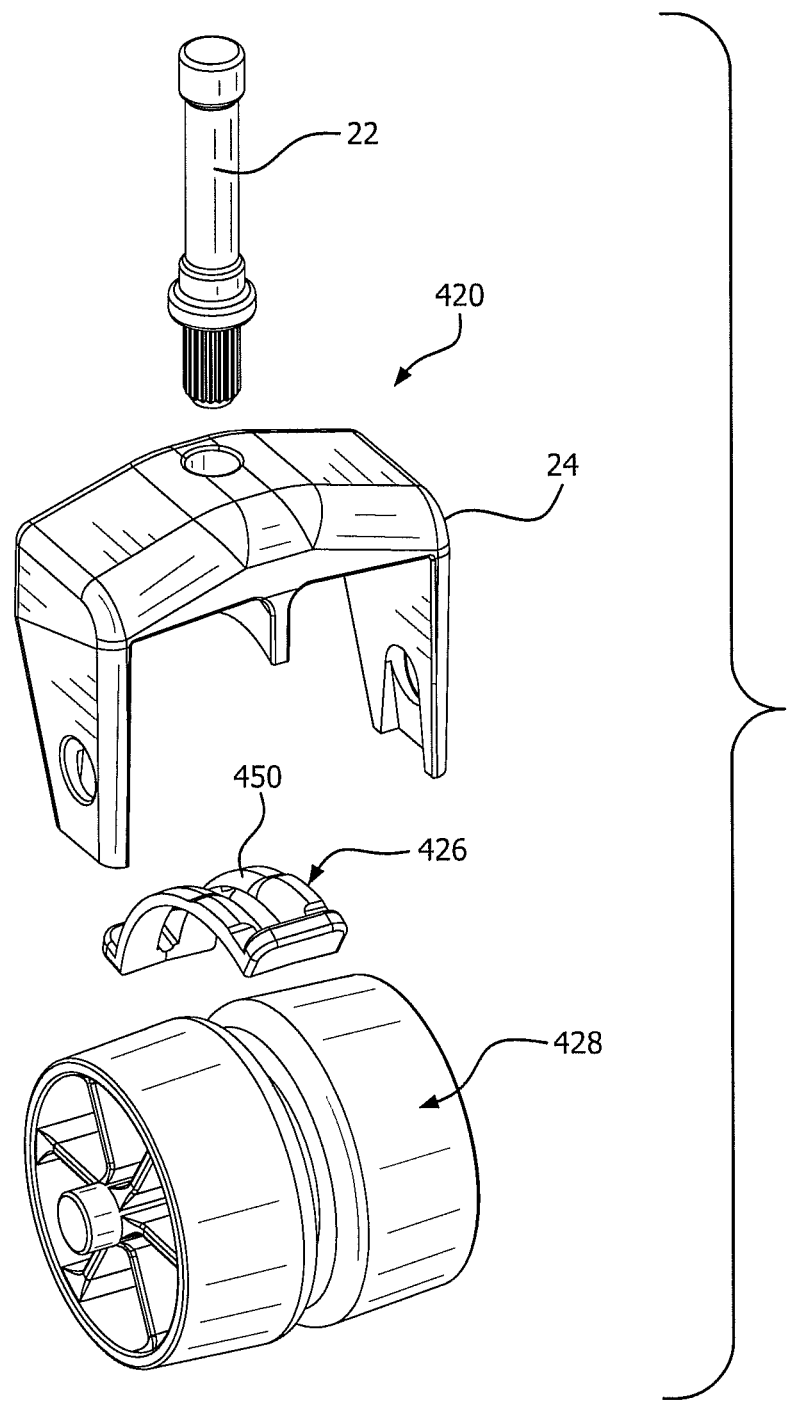
FIG. 7 shows a fourth alternate embodiment of the caster in accordance with the present invention.

FIG. 7 shows a caster 420 having a modified brake 426 which comprises a shoe 450 which is similar to brake shoe 50 except for its size and lacking the external/outer shoe ribs.

Figure 8:
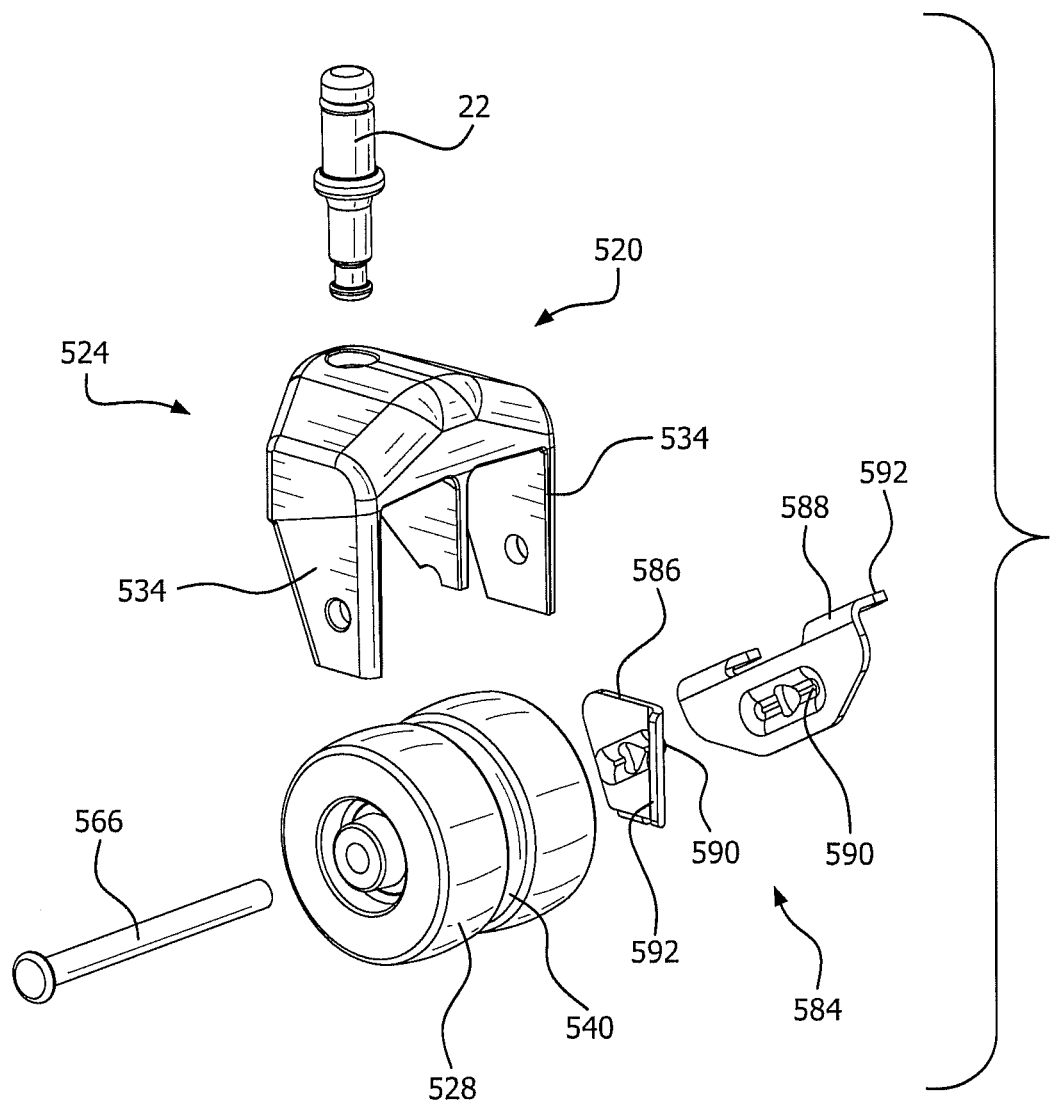
FIG. 8 shows a fifth alternate embodiment of the caster in accordance with the present invention.
Figure 9:
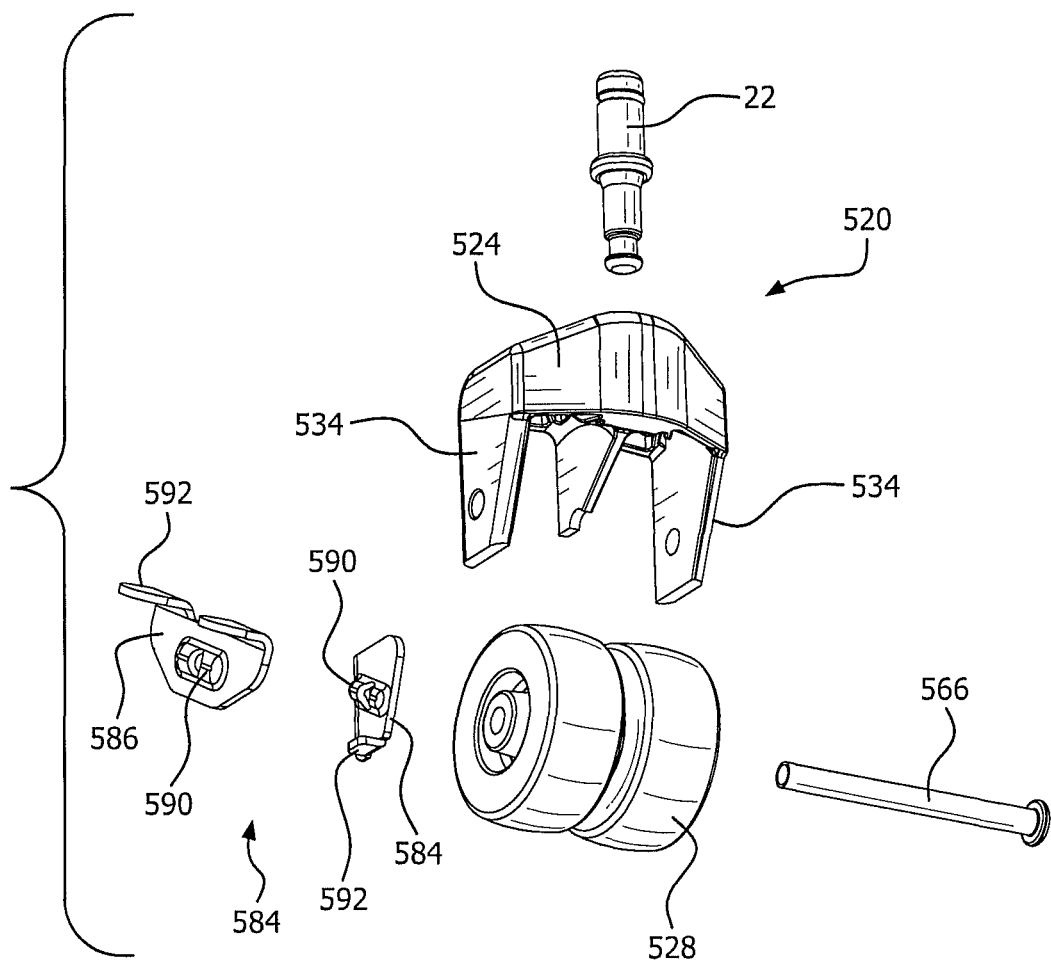
FIG. 9 shows the fifth alternate embodiment of the caster of FIG. 8 from a different perspective view.

FIGS. 8 and 9 show caster 520 which includes a side brake assembly 584. The side brake 584 includes an inner part 586 and an outer co-acting part 588. The side brake is located on the axle 566 and rotates thereon. The brake parts 586 and 588 have detents 590 which coact to press the legs 534 of yoke 524 together against the wheel assembly 528 to apply a braking force. This side brake design 584 is especially helpful for caster designs having axles in which the tab 538 does not apply a braking force or a sufficient braking force when engaged with the outer surface of the groove/wheel surface/disk 540 of the wheel 528. The brake parts 586 and 588 also include rotation limiting tabs 592 which also serve as user actuation handles.

Figure 10:
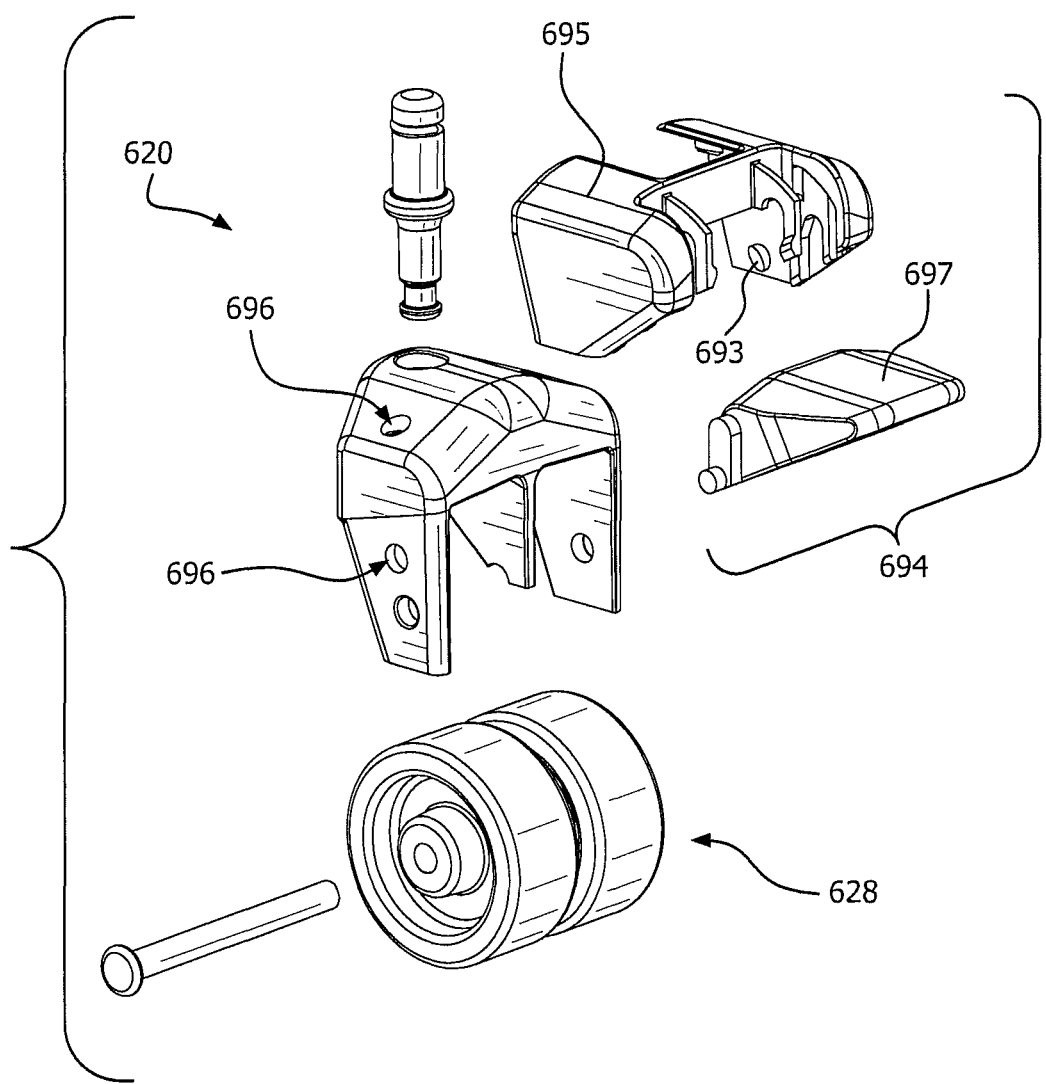
FIG. 10 shows a sixth alternate embodiment of the caster in accordance with the present invention.
Figure 11:
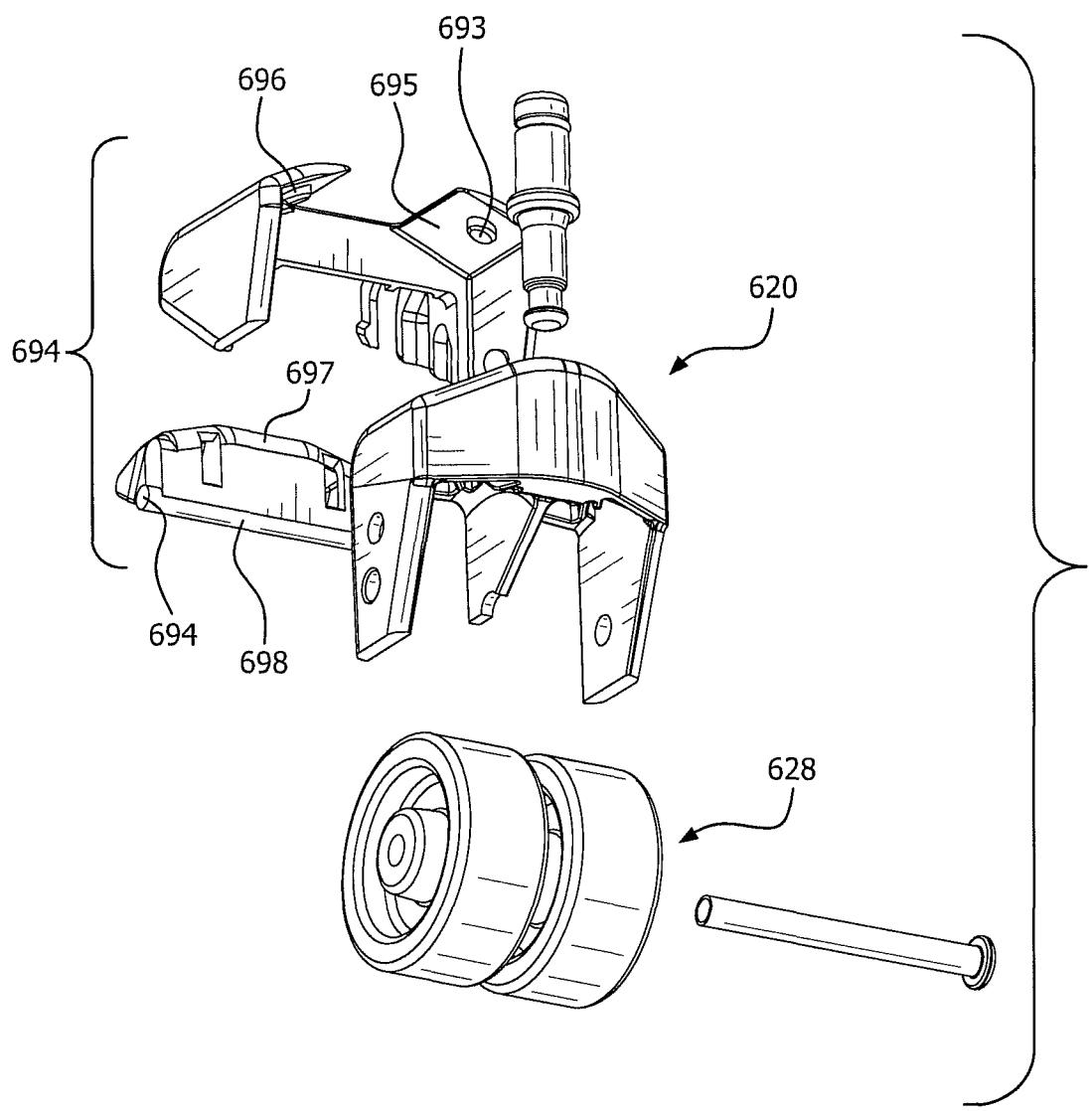
FIG. 11 shows a sixth alternate embodiment of the caster of FIG. 10 from a different perspective view.

FIGS. 10 and 11 show a caster 620 having a tread brake 694. The tread brake assembly 694 includes a static mount 695 that attaches to the top of the yoke 624 via a tab 693 and hole configuration 696. A pivotable brake shoe 697 pivotably attaches to the mount 695 via tabs 699 at the end of a transverse member 698 and holes 696 as shown and has a transverse member 698 that engages with the outer surface of the wheel assembly 628 to apply a braking force.

Figure 12:
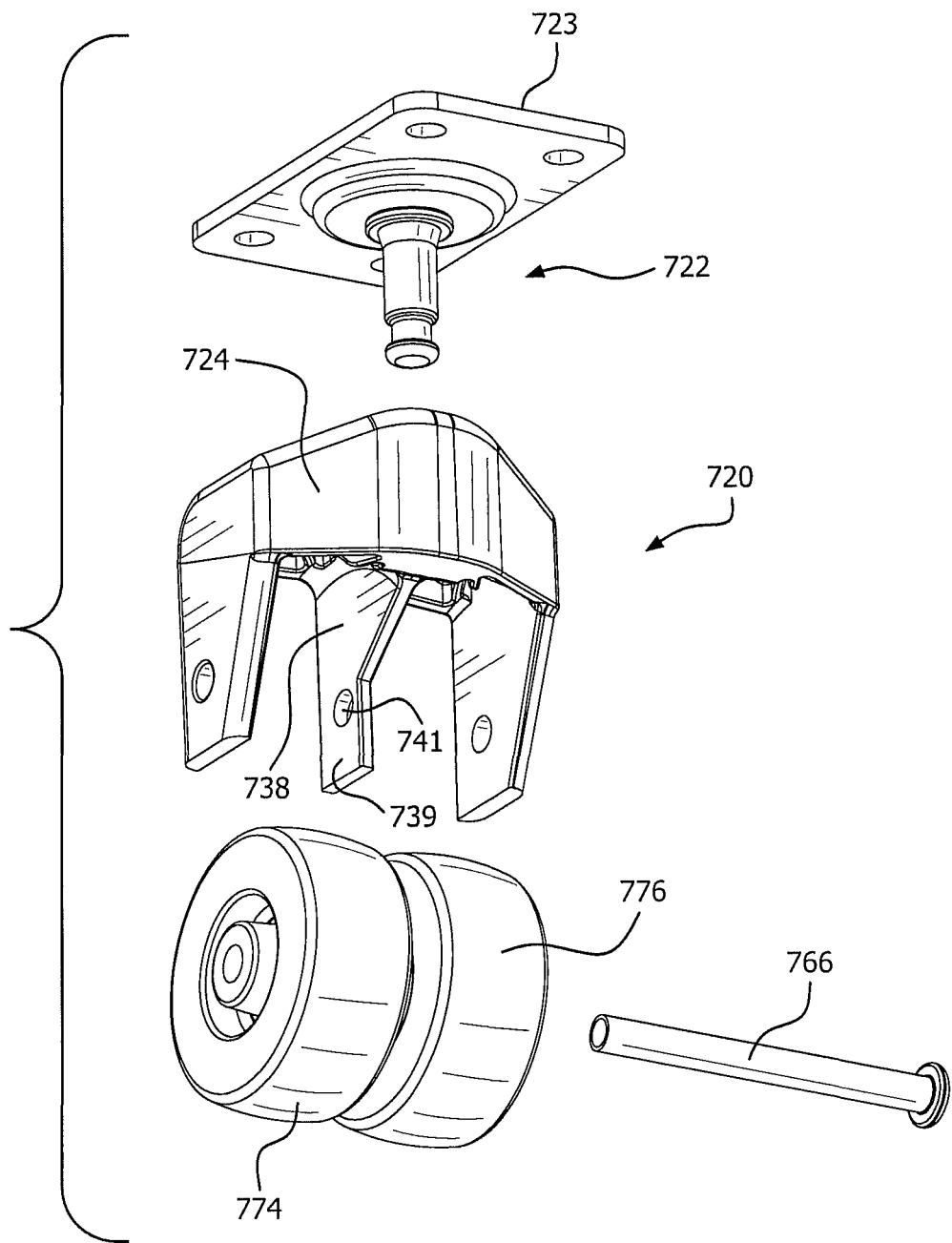
FIG. 12 shows a seventh alternate embodiment of the caster in accordance with the present invention.
Figure 13:
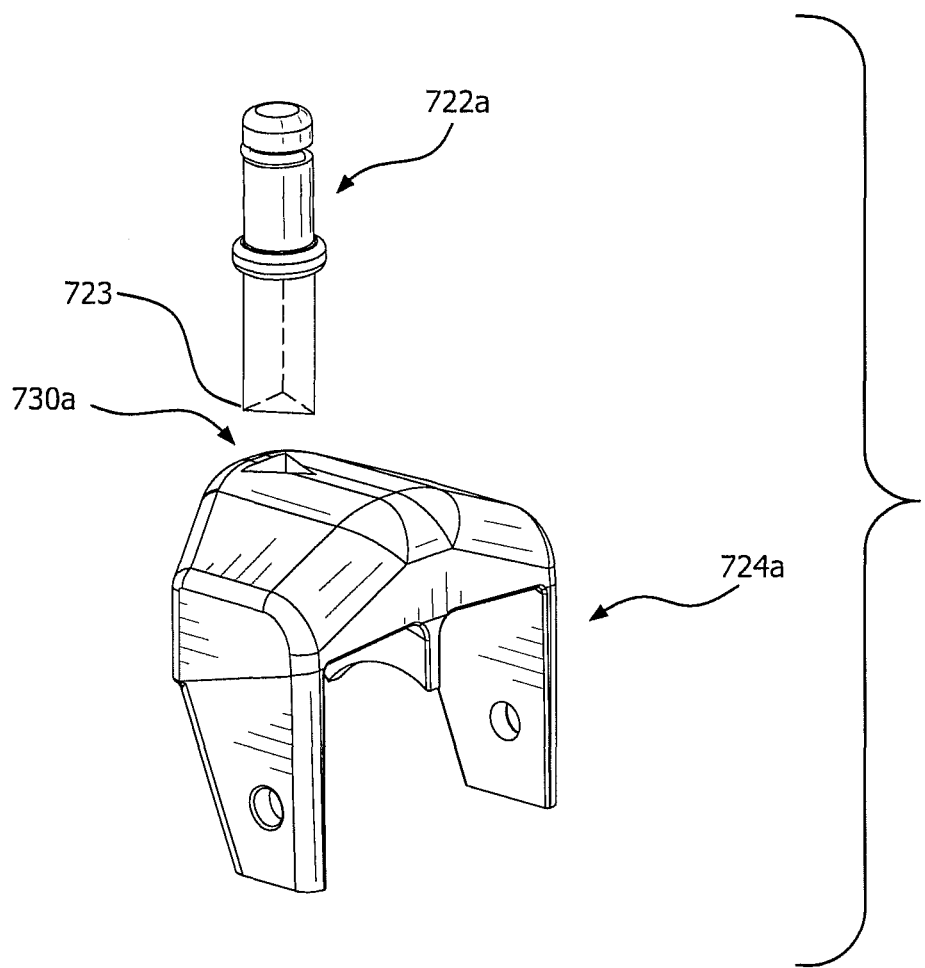
FIG. 13 shows a partial view of an alternate design of the yoke and stem of the caster of the present invention.

FIG. 12 shows a caster 720 having a stem 722 with a flat plate 723 which is typically suitable for mounting to articles such as store displays and the like. The stem 722 may be rotatable or fixed. As best seen in FIG. 13, the caster may also have a stem 722a mounting hole 730a in the yoke 724a with a geometric shape, such as triangular or square shape, with the lower part of the stem 722 having a complementary shape 723 that permits precise alignment of the flat plate relative to the back-to-front axis of the yoke so that for fixedly mounted stems the plate is aligned such that when the caster is mounted to an article the caster will roll straight. Referring back to FIG. 12, caster 720 also includes a weight bearing tab 738 with a lower extending spacing piece 739. This extended design extends below the axle and prevents inward canting of the wheels 774 and 776. Tab 738 includes a hole 741 for the axle 766 to pass through.

Figure 14:
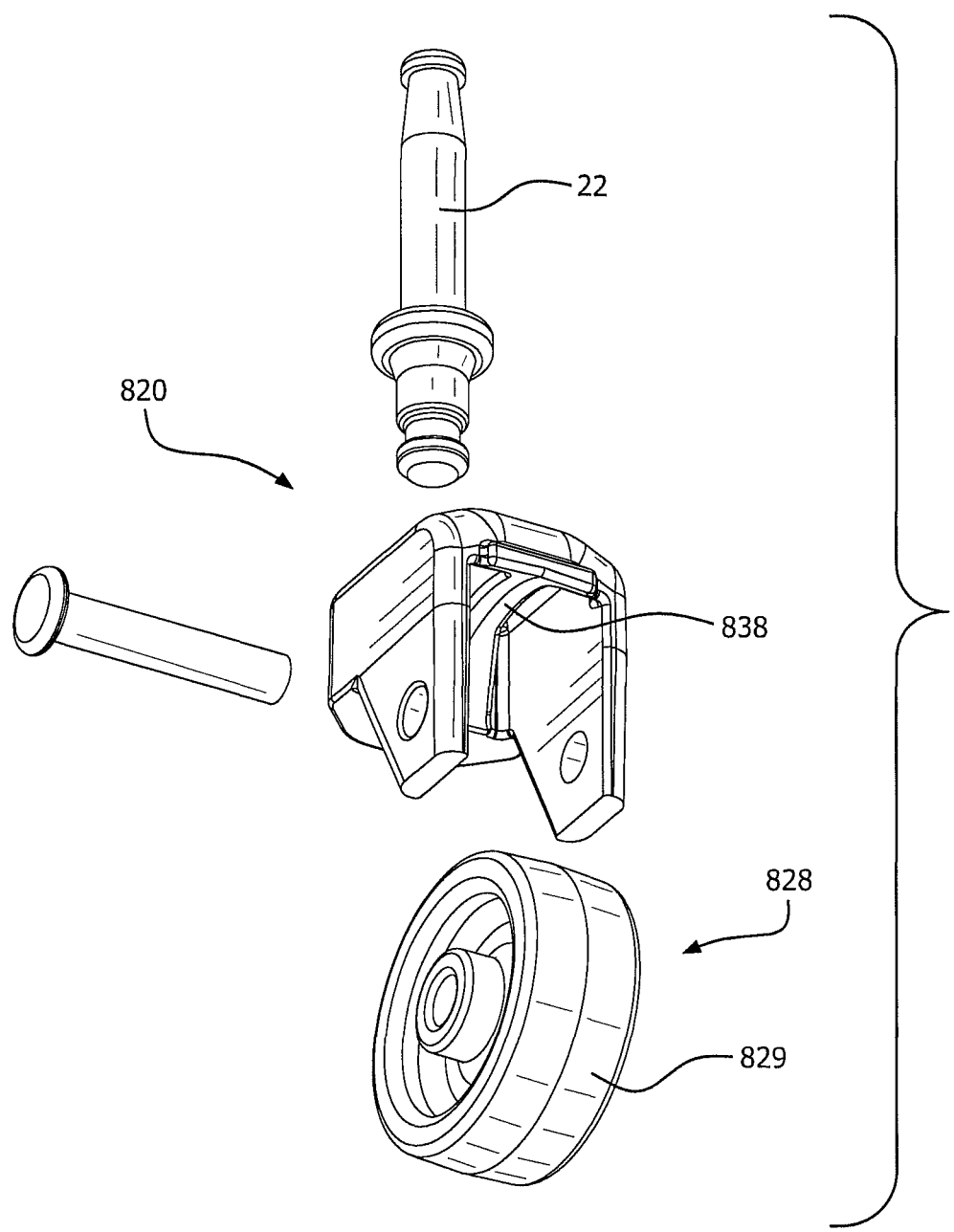
FIG. 14 shows an eighth alternate embodiment of the caster in accordance with the present invention.

FIG. 14 shows a caster 820 having a single wheel 828 design. The caster 820 includes a weight bearing tab 838 formed on the underside of the yoke 824. The tab 838 engages the outer surface 829 of the wheel 874.

It should be understood that the various stem, brake, tab, and wheel configurations described herein in connection with the various embodiments are generally interchangeable.

The particularly embodiments described herein is provided by way of example and is not meant in any way to limit the scope of the claimed invention. It is understood that the invention is not limited to the disclosed embodiments, but on the contrary, is intended to cover various modifications and equivalent arrangements included within the spirit and scope of the appended claims. Without further elaboration, the foregoing will so fully illustrate the invention, that others may by current or future knowledge, readily adapt the same for use under the various conditions of service.

I claim:

1. A caster comprising:
   a yoke having a weight transferring tab being fixedly attached to the yoke;
   a separate axle attached to the yoke on which at least one wheel rotates
   the at least one wheel being rotatably attached to the yoke, the at least one wheel having a groove that receives the weight transferring tab, wherein the tab transfers the weight of a load applied to the yoke directly to the axle, applying a downward force to the axle.

2. The caster of claim 1, further comprising a stem, the stem being connected to the yoke and being ratable with respect to the yoke.

3. The caster of claim 1, further comprising a stem, the stem being connected to the yoke and being non-rotable with respect to the yoke.

4. The caster of claim 3, wherein when an end of the stein has a directional shape and a bore formed in the yoke that receives the stem has a complementary shape, together the shape of the stem and yoke bore ensure that the stem is aligned with a direction in which the caster travels when in use.

5. The caster of claim 4, wherein the stem comprising a flat plate which is aligned with the direction in which the caster travels when in use.

6. The caster of claim 1, further comprising a stem, the stem comprising a flat plate that attaches to the load.

7. The caster of claim 1, further comprising a side brake or a tread brake for applying a braking force.

8. The caster of claim 7, wherein the at least one wheel is a single wheel, or comprises a pair of separate wheels.

9. The caster of claim 1, wherein the at least one wheel is a single wheel, or comprises a pair of separate wheels.

10. The caster of claim 1, further comprising a stem, wherein the stem is disposed substantially on a centerline of the yoke and wherein the tab transfers the load applied to the stem directly to the axle.

11. The caster of claim 1, further comprising a stem, wherein the stem is attached to the yoke by a snap-fit connection or a press-fit connection.

12. The caster of claim 1, further comprising a stem, wherein the stem has a directional shape and the yoke has a hole with a complementary shape.

13. The caster of claim 12, wherein the directional shape is a triangular or square.

14. The caster of claim 1, wherein the yoke is capable of supporting at least about 250 pounds of weight applied to the caster.

15. The caster of claim 1, wherein the groove is formed in part by an interposed disk.

16. A caster comprising:
    a yoke having a weight transferring tab being fixedly attached to the yoke;
    a wheel or a pair of separate wheels being rotatably attached to the yoke, the wheel having a groove that receives the weight transferring tab, wherein the tab transfers the weight of a load, applying a downward force to the groove;
    a separate axle attached to the yoke and on which the wheel rotates; and
    a stem, the stem being connected to the yoke and being rotable or non-rotatable with respect to the yoke, the stem comprising a flat plate that attaches to the load.

17. The caster of claim 16, wherein the groove is formed in part by an interposed disk.

18. The caster of claim 16, further comprising a side brake or a tread brake for applying braking force.

\* \* \* \* \*